June 14, 1927.
H. M. HOBART
INDUCTION MOTOR
Filed Oct. 4, 1924
1,632,601
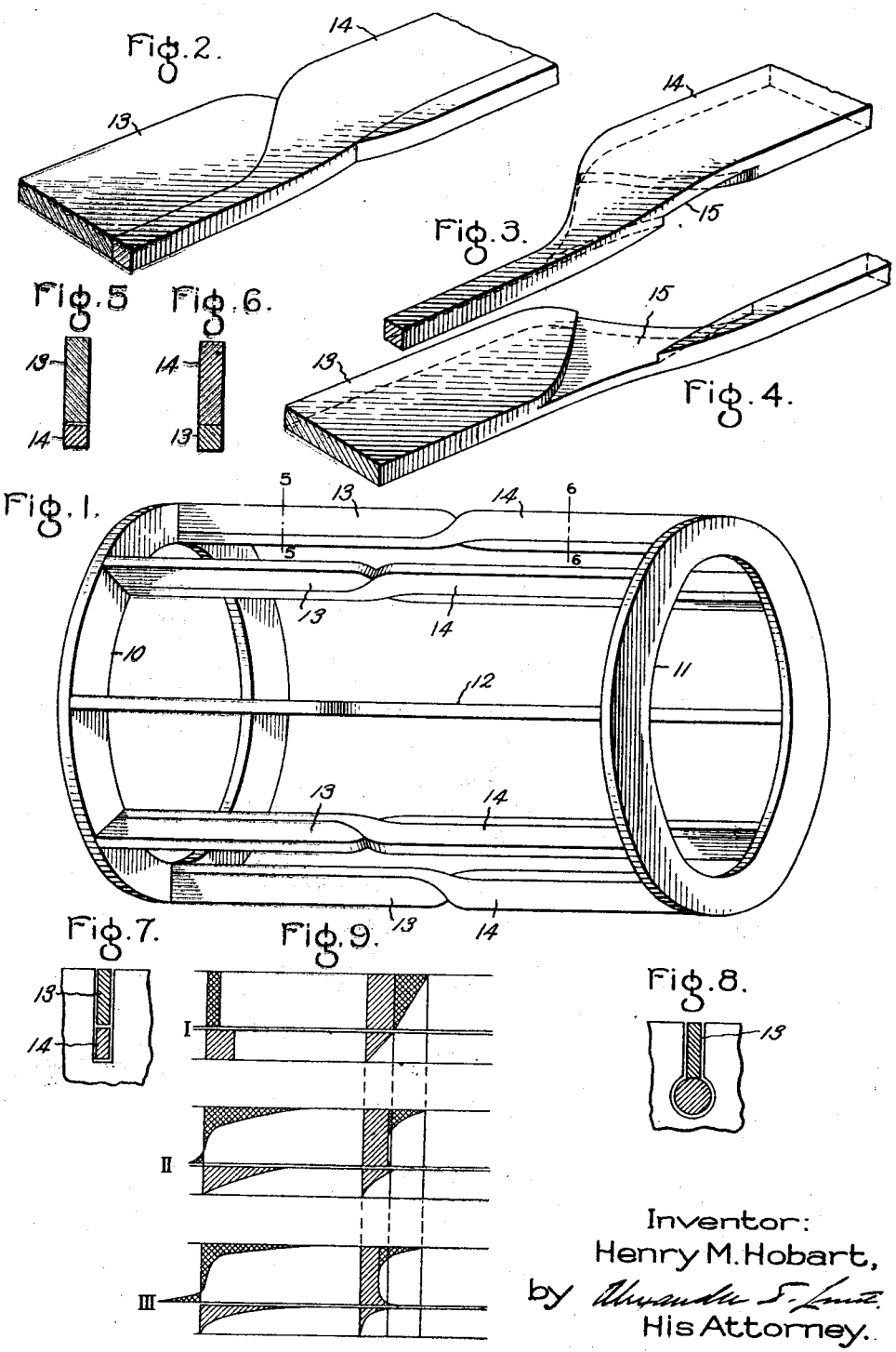
Inventor:
Henry M. Hobart,
by *Alexander S. Lentz*
His Attorney.

Patented June 14, 1927.

1,632,601

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

INDUCTION MOTOR.

Application filed October 4, 1924. Serial No. 741,743.

My invention relates to induction motors, and more particularly to the secondary windings of such motors.

My invention relates to an improvement in the type of secondary induction motor windings described in United States Patent 1,188,182, Kierstead, June 20, 1916. The winding described in said patent is made up of two or more relatively deep conductor bars per slot of equal depth arranged one above the other and connected so that equal secondary currents will flow in all of such conductors. By this arrangement an increased starting torque is obtained because of the increased eddy current loss produced in the upper conductor or conductors due to the flux cutting said conductors, set up largely by the current flowing in a lower conductor or conductors.

According to the Kierstead patent, the various conductors in a slot are designed to be of equal depth and cross sectional area. I have discovered that in a two-bar per slot winding of this type it is only necessary to have the upper conductor of substantial depth and that the lower conductor may be made relatively thin radially without sacrificing the beneficial effects of this type of winding and that by such an arrangement a more economical and desirable distribution of copper in the secondary winding is obtained.

According to my invention I make the upper conductor in the slot relatively deep and the lower conductor relatively shallow and arrange the connections such that the secondary current in both conductor sections per slot is the same. Since the eddy currents exist for the most part in the upper conductor and are greater the greater its depth, it is important that the greatest practicable part of the total available depth should be allotted to the upper conductor.

The features of my invention which are believed to be novel and patentable will be pointed out in the claim appended hereto. For a better understanding of my invention, reference is made to the following description to the accompanying drawing where I have shown in Fig. 1 a squirrel cage rotor winding built in accordance with my invention, the upper and lower conductor sections per slot being crossed from the top to the bottom at the center of the rotor so as to cause equal secondary currents to flow in both sections; Fig. 2 shows a perspective view of one of the composite squirrel cage bars removed; Figs. 3 and 4 show the sections of the composite bar as being separated; Figs. 5 and 6 represent cross sections of a component bar taken on lines 5—5 and 6—6 of Fig. 1 respectively; Fig. 7 represents the arrangement of such a bar in the rotor slot; Fig. 8 represents an alternative arrangement; and Fig. 9 is a diagrammatic illustration of the current and flux distributions of the conductor sections at different frequencies.

Eddy currents in the secondary windings of an induction motor at starting produce high losses in this winding and thereby increase the starting torque of the motor. Since the eddy current losses are a direct function of the frequency, it will be apparent that such losses are greatest when the frequency is highest. Therefore eddy currents produce in the secondary windings of an induction motor high losses when the secondary currents are of high frequency, as when the motor is starting or being reversed or when the slip is large. When the motor is up to its full speed however, the eddy currents are nearly zero since the frequency of the secondary current is nearly zero.

Considering now the current density in a conductor bar of a secondary winding; when the frequency is zero the current distribution is uniform throughout the conductor. As the frequency increases, the current density of the top of the conductor increases while the current density at the bottom of the conductor decreases due to the fact that the reactance is higher at the bottom of the conductor than at the top. At first, with relatively low frequency, the reactance is small in comparison with the ohmic resistance of the conductor, which accounts for the very gradual change in the current distribution under such conditions. As the frequency becomes higher, the reactance becomes high in comparison with the ohmic resistance and the change in current distribution is then quite rapid.

Considering now the flux distribution, the maximum flux density about a secondary conductor is at the top of the conductor and does not change with the frequency. This is due to the fact that the density of the flux at the top of the conductor is determined by the total current flowing in the conductor, whereas the density of the flux which cuts the conductor at any point radially beneath its top is determined by the fraction of the total current flowing in that section of the conductor located beneath the point of reference. Thus, the density of the flux which cuts the conductor at any point radially beneath the top of the conductor decreases as the frequency increases due to the crowding of the current toward the top of the conductor.

These principles apply alike to the winding described in the Kierstead patent previously referred to, and to the winding of the present invention. The present invention is limited to so proportioning the depths of the top and bottom conductors as to increase the effectiveness, for a given available total depth, of a secondary winding involving these principles.

Referring now to the drawing, Fig. 1 shows a squirrel cage winding made up of end rings 10 and 11 and composite bars 12 having sections 13 and 14. Each section has a relatively deep portion at one end and a relatively shallow portion at the other end and the sections are shaped and recessed at the centers as shown at 15, Figs 3 and 4, so as to cross each other from top to bottom in the slot and when thus fitted together, as represented in Fig. 2, have a shape substantially conforming to a straight rectangular bar and are thus adapted to fit into standard rectangular slots. The contacting surfaces of the two sections are preferably enamelled or coated with shellac or some other insulating compound so that the secondary current flowing from end to end through the bars is substantially equal in the two sections.

It will be evident that at the instant of starting, when the secondary current is a maximum, there will also be considerable eddy current in the upper section which does not exist, except to a very limited extent, in the lower section. These eddy currents produce heating losses and starting torque. Consequently, the heat loss through the component conductor bars at starting will be more evenly distributed than would be the case if both the upper and lower sections were of the same cross section and depth. When the motor comes up to speed and the eddy currents decrease to a negligible value, the normal secondary current also decreases, although not to the same extent, so that the limiting factor so far as heating is concerned, is largely a matter of taking care of the heat loss at starting. For normal operation, the current density in the lower section may be quite high because of the relatively good thermal contact which such section has with the larger upper section. Consequently, the heat is rapidly dissipated from the lower conductor sections.

Referring now to Fig. 9, I have diagrammatically illustrated in the left hand column the current distribution in the composite conductor of my invention when the current is (I) of zero frequency, (II) of relatively low frequency, and (III) of relatively high frequency. In the right hand column of Fig. 9 I have represented the flux densities under the same conditions. The double cross hatched portions of the right hand column indicate that part of the total flux which is due to the current flowing in the upper section 13 of the composite conductor, while the single cross hatched portions of the right hand column indicate that part of the total flux which is due to the current flowing in the lower section 14 of the composite conductor. It will be evident that the flux distribution through the upper conductor section is substantially what it would be if the lower conductor section were made of the same depth and cross sectional area as the upper section. Consequently, it will be evident that the advantages of the windings described in the Kierstead patent are retained by this construction, but that the total depth of slot necessary to obtain these advantages has been materially reduced by my invention, or for a given total depth of slot, a greater loss and more torque at starting are obtained.

In Fig. 8 I have represented an alternative arrangement where the lower copper section comprises a round bar instead of being rectangular. A slightly different current distribution at high frequency will be produced in the lower conductor by this modification, but the flux distribution will remain substantially the same, as represented in Fig. 9.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:—

In an induction motor, a secondary member comprising a magnetic member having a plurality of relatively deep slots, two radially arranged conductor bars in each slot, each conductor bar being so constructed that through half its length it is a bottom bar of relatively small depth and through the remainder of its length it is a top bar of relatively large depth, the conductor bars in the same slot being connected at their ends to common end rings.

In witness whereof, I have hereunto set my hand this 3rd day of October, 1924.

HENRY M. HOBART.